Dec. 4, 1956        F. D. BONNIN        2,772,891

VEHICLE SPRING AND END CONNECTION ARRANGEMENT

Filed April 1, 1955        2 Sheets-Sheet 1

FRED D. BONNIN
INVENTOR

HUEBNER, BEEHLER,
WORREL & HERZIG
ATTORNEYS

BY

Dec. 4, 1956  F. D. BONNIN  2,772,891
VEHICLE SPRING AND END CONNECTION ARRANGEMENT
Filed April 1, 1955  2 Sheets-Sheet 2

FRED D. BONNIN
INVENTOR
HUEBNER, BEEHLER,
WORREL & HERZIG
ATTORNEYS
BY

United States Patent Office 2,772,891
Patented Dec. 4, 1956

2,772,891

VEHICLE SPRING AND END CONNECTION ARRANGEMENT

Fred D. Bonnin, Malaga, Calif.

Application April 1, 1955, Serial No. 498,554

3 Claims. (Cl. 280—124)

The present invention relates to vehicle suspension systems and more particularly to improvements in mountings for spring suspension systems employed in load transporting devices.

It is conventional practice to employ independent suspension systems in load transporting devices, such as trucks, trailers and the like, which provide for individually supporting opposite ends of an axle on laminated leaf springs positioned between the axle and a chassis or vehicle frame. The stacks of leaf springs frequently provide opposite ends slidably received in shackles attached to the chassis and are connected intermediate their ends to the axle.

In tandem axle load transporting devices, the shackles may be attached to the axles and the leaf springs connected centrally to the chassis. Another arrangement in tandem axle devices is to provide pivotally interconnected forward and rearward sets of laminated springs with the forward ends of the forward springs and the rearward ends of the rear springs, respectively, slidably fitted in shackles or brackets provided for the purpose. Common to all of these arrangements is the cushioned support of the chassis on the axles made possible by the interposed laminated springs.

It is conventional to fix each stack of laminated leaf springs against transverse rocking or rolling movement relative to the direction of travel of the vehicle. This has resulted in certain problems which the present invention overcomes.

It is well known that the maximum load which can be safely borne by a vehicle in earth traversing movement is dependent upon the uniformity of distribution of the load over the support surface of a roadway or the like engaged by the wheels of the vehicle. Any substantial concentration of the load on a particular wheel or wheels subjects the support surface to undue stress and strain and such wheels and their tires to undue load and wear. On level terrain, the support wheels on opposite sides of a vehicle are normally in horizontal alignment and bear substantially equal loads. Conventional spring suspension systems of the character described, tend to maintain the wheels in such horizontal alignment or, expressed differently, impose excessive loads on wheels which are elevated from normal position with respect to the vehicle and vastly reduced loads on wheels which are lowered. Thus, when a wheel at one end of an axle descends into a depression traversed by the vehicle, the wheel at the opposite end of the axle is subjected to a vastly increased load. Similarly, when a wheel at one end of such an axle traverses an elevation, it is suddenly caused to bear much more than its normal burden. Not only do such occurrences cause excessive tire wear and rupture and damage to roads traversed, but also impart objectionable twisting or tortional strains on the support springs frequently resulting in crystallization and breakage thereof.

Accordingly, it is an object of this invention to provide an improved spring suspension system for load transporting vehicles conducive to the maintenance of more even load distribution over support wheels of the vehicles.

Another object is to provide an improved support for a spring suspension system for use with load transporting devices.

Another object is to alleviate torsional or twisting force on laminated leaf springs incident to teetering movement of axles in load transporting vehicles transversely of the normal direction of movement thereof.

Another object is to maintain uniform distribution of the load on all the wheels in a load transporting vehicle during traversal of uneven terrain when wheels at opposite ends of an axle of the vehicle are elevationally displaced from normal position.

Another object is to provide a support for laminated leaf springs in spring suspension systems which accommodates transverse rocking movement of the springs relative to the support.

Other objects are to provide a spring suspension system having an improved support for the springs which is simple and economical in construction, readily adapted to conventional spring systems, dependable in operation and which is highly effective for accomplishing its intended purposes.

These and other objects will become more apparent from reference to the following descriptions.

Figure 1:
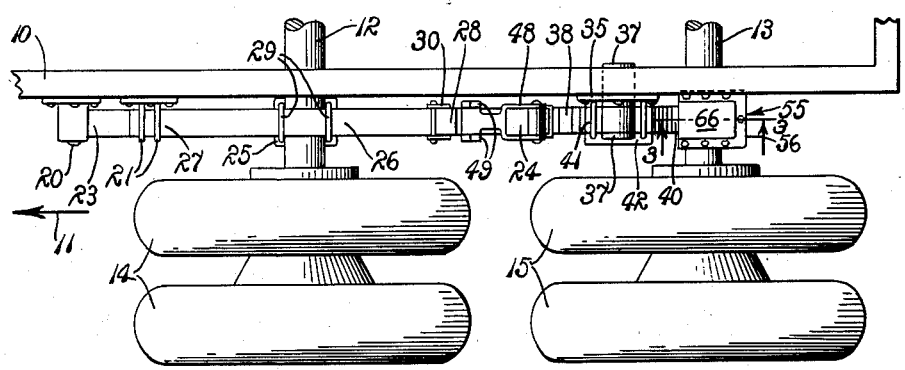
Fig. 1 is a fragmentary top plan view of a load transporting vehicle employing a spring suspension system embodying the principles of the present invention.
Figure 2:
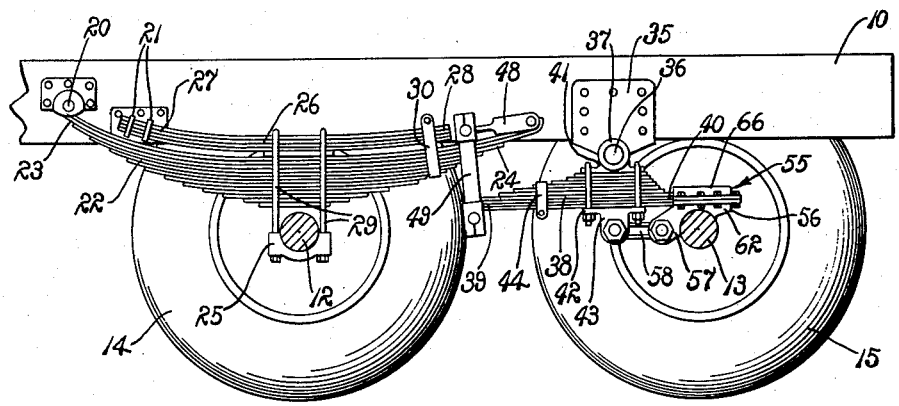
Fig. 2 is a fragmentary side elevation of the load transporting vehicle showing earth engaging wheels at the side of the vehicle opposite to that shown in Fig. 1, with axles of the vehicle being shown in vertical section for illustrative convenience.

Referring more particularly to the drawings:

The principles of the present invention are illustrated in association with a frame 10 having a predetermined forward direction of earth traversing movement, indicated by arrow 11, typical of the type of load supporting frame or chassis employed in trucks, trailers, wagons and the like. Forward and rearward tandem axles 12 and 13, respectively, are shown in transverse position relative to the direction of frame movement which mount, respectively, forward and rearward dual tired wheels 14 and 15 thereon.

Inasmuch as the spring suspension system is identical on both sides of frame 10 detailed reference is made only to one side in the following description.

A forward pivot pin 20 is extended laterally of the frame 10 forwardly of the axles 12 and 13. A forward overload bracket 21 is mounted laterally on the frame somewhat rearwardly of the forward pivot pin. An elongated main stack or group of laminated leaf springs 22 is positioned in arched disposition over the forward axle 12 and provides a forwardly extended end 23 pivotally journalled on the forward pivot pin and a rearwardly extended end 24. The forward stack of springs are centrally connected to the forward axle 12 by a spring mounting clamp 25.

A forward auxiliary group or stack of overload leaf springs 26 provide a forwardly extended end 27 slidably received in the forward overload bracket and a rearwardly extended end 28. The auxiliary springs are held intermediate their ends in fixed relation to the main group of forward springs by U bolts 29 engaged in the clamps 25 and the forward end slidably received in the bracket 21. A shackle 30 is provided around both the main and overload springs at the rearward ends thereof for maintaining the springs in proper overlying relation. The shackle is fixedly mounted on the main springs and slidably receives the rearward end 28 of the spring 26.

A spring hanger bracket 35 is attached laterally on the frame 10 intermediate the forward and rearward axles 12 and 13 and rearwardly of the rearward ends 24 and 28 of the springs. A rearward mounting shaft 36 is supported in the hanger bracket in transverse position relative to the direction of movement of the frame 10 and provides an outwardly extended end 37. An elongated stack or group of rearward laminated leaf springs 38 is provided having a forwardly extended end 39 adjacent to the rearwardly extended end 24 of the forward springs 22 and a rearwardly extended end 40. An upper journal bracket 41 is dependently and pivotally supported on the outwardly extended end of the mounting shaft. A spring mounting clamp 42 including a lower journal bracket 43 is fitted around the rearward springs intermediate the ends thereof and supports the spring 38 on the upper journal bracket with the springs in clamped relation therebetween. A clip 44 is fitted on the rearward springs in order to maintain them in proper overlying stacked relation.

A shackle link 48 is pivotally connected to the rearwardly extended end 24 of the forward group of springs 22 and a load divider shackle 49 pivotally interconnects the shackle link and the forwardly extended end 39 of the rearward springs. The forward end of the link 48 rests on the springs 22.

The foregoing structure is largely well known and provides a suitable environment for incorporating the principles of the present invention. The cooperative action of the springs 22, 26, and 38 are well-known in the art and not summarized herein. As before stated, only the apparatus on one side of the frame has been specifically discussed although it is to be understood that each element has its counterpart on the opposite side of the frame and in substantially transverse alignment therewith.

The instant invention provides a pair of bearing support brackets 55 rigidly supported in spaced relation on the rear or tag axle 13, each including a housing 56 positioned on the axle and a downwardly forwardly extended journal arm 57 integral therewith. Lower radius rods 58 pivotally interconnect the journal arms and the lower journal brackets 43 in fixed spaced relation.

The housings 56 of the bearing support brackets 55 each include a base portion 62 welded or otherwise rigidly secured to the axle 13 and having an internal flat bottom wall 63, a pair of upwardly extended side walls 64 and a flange 65 extended therefrom along opposite transverse sides and the rear side thereof. The housing also includes a covering plate 66 having a downwardly disposed, transversely convex wall 67, a continuous wall 68 along opposite sides and the rear thereof and a flange 69 overlying the flange 65 and releasably connected thereto by bolts 70.

The base portions 62 and plates 66 define pockets 75 having open forward ends and closed rearward ends for receiving the rearwardly extended ends 40 of the rearward springs 38 with said rearwardly extended ends being supported on the bottom wall 63 of the base 62 and with the upper arcuate wall 67 in contact or in closely spaced relation with said rearwardly extended ends. The bolts 70 serve to hold the plates 66 and base portions 62 in assembled relation with the rearward ends 40 of the springs 38 captured therein.

Operation

The operation of this invention is believed readily apparent and is briefly summarized at this point.

Figure 3:
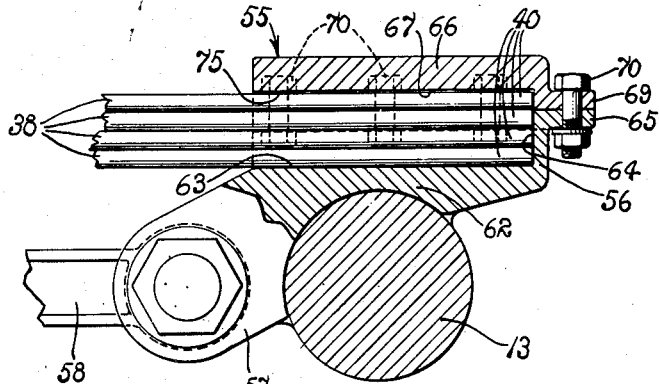
Fig. 3 is a somewhat enlarged vertical section taken on line 3—3 of Fig. 1.
Figure 4:
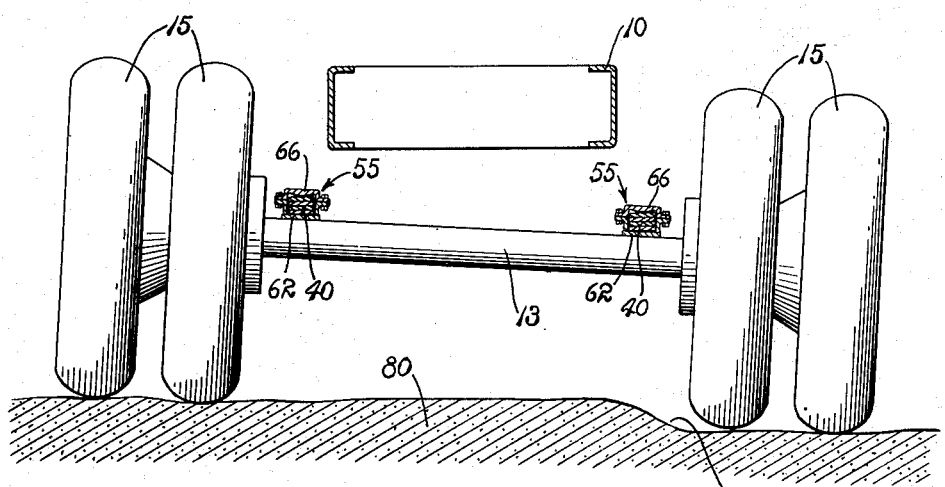
Fig. 4 is a fragmentary rear elevation of the load transporting device of Figs. 1 and 2 employing the spring suspension support system and illustrating the action thereof during traversal of uneven terrain.
Figure 5:
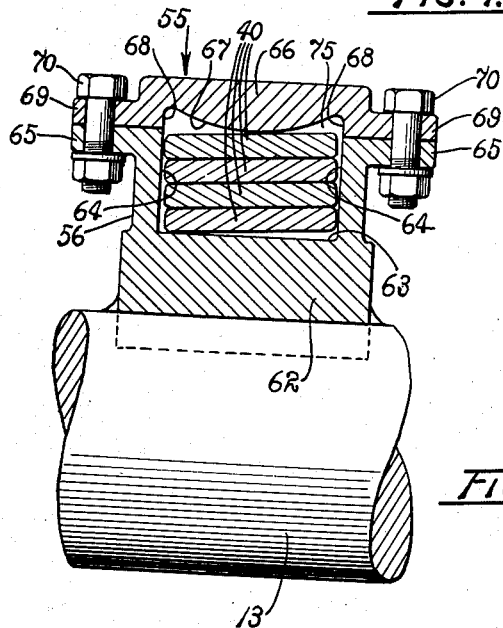
Fig. 5 is a somewhat enlarged fragmentary view of the axle and spring suspension support in the same position as shown in Fig. 4.

With reference to Figs. 3, 4 and 5, in particular, and assuming that the frame 10 is moving forwardly over the terrain indicated at 80, the load causes the rearwardly extended ends 40 of the rear springs to bear downwardly against the bottom wall 63 of the respective bearing support brackets 55. The bearing support brackets permit limited longitudinal sliding movement of the ends 40 in the pockets 75 thereof incident to elevational flexing of the springs as the wheels 14 and 15 pass over elevations and depressions in the terrain.

The features of the present invention come into play when one of the sets of rear wheels 15, for example those at the right when viewed from the rear as seen in Fig. 4, falls into a depression indicated at 90 while the rear wheels at the left remain on level terrain or are otherwise elevationally displaced from the right wheels. This causes the rear axle 13 to tilt downwardly toward the right. Inasmuch as the forward wheels 14 are both on level terrain, the rear axle is angularly skewed relative to the forward axle 12. Over a length of uneven terrain, this movement can be visualized as a vertical teetering of the rear axle relative to a horizontal reference plane and transversely of the direction of movement.

In conventional systems of the character previously described, this relative teetering movement between the forward and rear axles 12 and 13 applies a twisting or torsional force to the rear left springs 38 around their longitudinal axes. In contrast thereto, the present invention permits relative movement between the rear axle and the rear ends 40 of the rear left springs. Thus, when the rear axle tilts in the manner above described, and as seen in Fig. 4, the upper arcuate wall 67 of the bearing support housing simply rolls over the end of the springs and minimizes torsional or twisting force thereon. As magnified by Fig. 5, the bearing support housing assumes a tilted attitude in relation to the rear springs which are permitted to remain in substantially transversely horizontal position.

It will be seen that the described relative rocking of the brackets 55 on the springs received in the pockets 75 minimizes spring resistance to transverse axle teetering. Therefore, the wheels are permitted more freely to descend into depressions and to traverse elevations. Inasmuch as a minimum of resistance is offered to the teetering, the springs 38 continue to impose a substantially constant load on their respective end of the axle 13 even though that end of the axle may rise or fall with respect to the chassis 10. It is of course recognized that some variation in axle loading results incident to the flexing of the springs 38 but such variation has been found in actual practice to be far less with the transverse rocking of the brackets 55 on the end 40 of the springs than when the springs are rigidly connected to the axle, or otherwise precluded from transverse rocking, as is the conventional practice.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. In a spring suspension system for a vehicle having an elongated leaf spring having transversely flat upper and lower surfaces and opposite end portions, means pivotally mounting the spring intermediate its ends in supporting relation on the vehicle with the ends of the spring forwardly and rearwardly extended from the mounting means, means interconnecting the forward end portion of the spring and the vehicle resiliently resisting pivotal movement of the spring, and an axle transversely disposed beneath the rearward end portion of the spring, said rearward end portion of the spring being of substantially uniform thickness for an appreciable distance forwardly from the extreme rearward end thereof; the combination of a bearing bracket mounted on the axle in supporting relation to the rearward end portion of the spring, said bracket having a pocket therein defined in part by a flat bottom wall receiving the spring flatly thereagainst and a transversely downwardly convex top wall engageable downwardly against the upper surface of the spring along a line longitudinally of the spring, and means connected to the bearing bracket and to the vehicle holding the bearing bracket against sliding movement longitudinally of the spring but accommodating rocking movement of the bracket transversely of the spring.

2. In a spring suspension system for vehicles having a frame providing predetermined forward and rearward end portions; a shaft mounted transversely of the frame; a pair of elongated transversely flat springs each having opposite side edges, central portions pivotally mounted on the shaft and ends oppositely extended forwardly and rearwardly from the shaft with respect to the frame; a bearing bracket having a pocket slidably mounted on the rearward end portion of each spring, each pocket being defined in part by a substantially flat bottom wall supporting the spring and a downwardly convex top wall engageable with the spring along a line longitudinally of the frame, said pocket being wider than the portion of the spring disposed therein to accommodate tilting relative to the spring; an axle disposed transversely of the frame having opposite ends disposed below and supporting the brackets; means rigid with the frame disposed below the central portion of each spring; and a radius rod pivotally connected to each bracket and to the rigid means below its respective spring, the pivotal connections of the radius rods to the brackets and to the rigid means being in substantial horizontal alignment with the axle whereby the axle can rise and fall about the pivotal connections of the radius rods to the rigid means without appreciable sliding of the brackets on the springs, and can tilt transversely of the frame by transverse tipping actions of the bottoms of the springs on the flat bottom walls of their respective bearing brackets and transverse rocking action on the downwardly disposed convex top walls of said bearing brackets.

3. In a spring suspension system for a vehicle having an elongated leaf spring having transversely flat upper and lower surfaces, opposite longitudinal side edges, and opposite end portions, means pivotally mounting the spring intermediate its ends in supporting relation on the vehicle with the ends of the spring forwardly and rearwardly extended from the mounting means, means interconnecting the forward end portion of the spring and the vehicle resiliently resisting pivotal movement of the spring, and an axle transversely disposed beneath the rearward end portion of the spring, said rearward end portion of the spring being of substantially uniform thickness for an appreciable distance forwardly from the extreme rearward end thereof; the combination of a bearing bracket mounted on the axle in supporting relation to the rearward end portion of the spring, said bracket having a pocket therein defined by a flat bottom wall receiving the rearward end of the spring flatly thereagainst, opposite side walls in adjacent spaced relation to the side edges of the springs, a transversely downwardly convex top wall engageable downwardly against the upper surface of the spring along lines of engagement substantially parallel to the side edges of the springs, the top wall and the bottom wall being spaced a distance substantially equal to the thickness of the rearward end portion of the spring, and an end wall adjacent to the rearward end of the spring, the bearing bracket being divided into separable top and bottom portions on a plane substantially parallel to the bottom wall; means releasably securing the separable portions of the bracket in assembled relation; means rigid with the frame disposed centrally below the spring; and a radius rod interconnecting the bearing bracket and said rigid means holding the bearing bracket against sliding movement longitudinally of the spring but accommodating rocking movement of the bracket transversely of the spring.

References Cited in the file of this patent

UNITED STATES PATENTS

| | | |
|---|---|---|
| 2,096,530 | Alden | Oct. 19, 1937 |
| 2,400,199 | Harbers | May 14, 1946 |
| 2,571,412 | Bonnin | Oct. 16, 1951 |